United States Patent [19]
Basler

[11] Patent Number: 6,092,606
[45] Date of Patent: Jul. 25, 2000

[54] STONE GATHERING APPARATUS

[76] Inventor: Jeffrey L. Basler, 1182 Old Knapp Rd., Oshkosh, Wis. 54901

[21] Appl. No.: 09/025,738

[22] Filed: Feb. 19, 1998

[51] Int. Cl.$^7$ .................................................. A01B 43/00
[52] U.S. Cl. .............................. 171/63; 37/405; 37/444; 172/247
[58] Field of Search ................ 171/63, 43, 144; 37/403, 405, 444, 903; 414/912, 724; 172/245, 247, 250, 252, 253

[56] References Cited

U.S. PATENT DOCUMENTS

| | | | |
|---|---|---|---|
| 2,597,374 | 5/1952 | Richey | 37/405 X |
| 2,612,280 | 9/1952 | Stueland | 37/405 X |
| 2,935,802 | 5/1960 | Wolfe et al. | 37/405 |
| 2,993,608 | 7/1961 | Womble | 37/405 X |
| 3,034,237 | 5/1962 | Wolfe et al. | 37/405 |
| 3,079,021 | 2/1963 | Kohorst et al. | 37/405 X |
| 3,168,922 | 2/1965 | Varga | 171/63 |
| 3,362,554 | 1/1968 | Fortier | 37/405 X |
| 3,557,877 | 1/1971 | Hoffman | 171/63 |
| 3,643,821 | 2/1972 | Viel | 171/63 X |
| 3,706,388 | 12/1972 | Westendorf | 37/405 X |
| 3,795,070 | 3/1974 | Bronson et al. | 37/405 |
| 3,834,567 | 9/1974 | Miller | 37/405 X |
| 4,125,952 | 11/1978 | Jennings | 37/405 |

FOREIGN PATENT DOCUMENTS 522305  3/1956  Canada ................... 37/405

*Primary Examiner*—Victor Batson

[57] ABSTRACT

A stone gathering apparatus adaptable for use with a front end loader or the like, useful for picking or gathering stones, rocks, and the like, from the ground surface, comprises (a) a receptacle having a generally horizontally disposed bottom or flooring, (b) spaced, vertical end walls, (c) a forwardly inclined back wall extending between the end walls and connected thereto, (d) a vertically disposed retaining bar extending between the end walls and connected thereto and disposed forward of the back wall and spaced therefrom, and (e) a plurality of horizontally disposed, spaced, parallel tines extending outwardly or forwardly from the retaining bar and adaptable for engaging the ground. The rear surface of the back wall is equipped with a suitable mount for attaching the apparatus to a front end loader.

14 Claims, 3 Drawing Sheets

STONE GATHERING APPARATUS

FIELD OF THE INVENTION

This invention relates to a stone gathering apparatus adaptable for use with a front end loader (or like vehicle). In its more specific aspect, this invention relates to a stone gathering apparatus adaptable for use with a front end loader (or like vehicle) for use in clearing cultivated, tilled, or cleared land or fields of stones, rocks, etc.

BACKGROUND AND PRIOR ART

When land is cleared or cultivated, such as by landscape contractors, building contractors, or farmers, stones or rocks come to the surface. In order to clear the land of such articles, stone gathering machines or rock pickers have been developed. These machines or apparatus typically comprise some type of scoop assembly or fixed prong assembly which engages and scoops the ground, and is then pivoted to dump the debris into a receptacle or hopper, or piled at a designated spot, or hauled away. Further, some such machines include a rotary rake, and the prior art machines typically are hydraulically operated for raising and dumping the picker. Such apparatus or machines are disclosed, for example in U.S. Pat. Nos. 4,296,818; 3,392,790; and 2,738,633.

The stone picking apparatus of the prior art, however, have several distinct disadvantages. Many such machines are drawn or pulled by a tractor or tractor-type vehicle, which places the operator in front or ahead of the gathering operation. Further, stone gathering machines utilizing a rotary rake and/or hydraulic lift means are unduly complicated.

This invention has, therefore, as its purpose to provide a stone gathering machine which is easily operated or maneuvered, which is simple in construction, and which does not employ or require hydraulic lift means.

SUMMARY OF THE INVENTION

In accordance with the present invention, there is provided a stone gathering apparatus adaptable for use with a front end loader, such as a BOBCAT, or other loaders or tractor-type vehicles in common use by contractors and farmers. The stone gathering apparatus, useful for picking or gathering stones, rocks, and the like, from the ground surface, comprises (a) a receptacle having a generally horizontally disposed bottom or flooring when in a stone gathering position, (b) spaced vertical end walls, (c) a forwardly inclined back wall extending between the end walls and connected thereto, (d) a vertically disposed retaining means extending between the end walls and connected thereto and disposed forward of the back wall and spaced therefrom, the retaining means projecting upwardly of the bottom, and (e) a plurality of horizontally disposed, spaced, parallel tines extending outwardly or forwardly from the retaining means and adaptable for engaging the ground. In a preferred embodiment, the back wall includes a lower planar surface or panel portion disposed adjacent the bottom or the receptacle and substantially normal thereto, and an upper planar surface being oblique to the lower surface and inclined forwardly as viewed in side elevation. The rear surface of the back wall is equipped with suitable means for attaching the apparatus to a front end loader or the like. The purpose and function of the components and operation of the apparatus are described below in detail.

Preferably, the retaining means comprises a vertically disposed retaining bar, dam, or barrier extending between the end walls and connected thereto. The retaining bar is forward of the back wall and spaced therefrom, and projects upwardly from the bottom a sufficient height to check the movement of the stones or rocks, as described below in greater detail. The back wall and the retaining bar are provided with a plurality of aligned holes, and the tines extend through the holes from the back wall and outwardly from the retaining bar, thereby forming the bottom of the receptacle as an open arrangement or network comprised of spaced, parallel tines disposed in a horizontal plane. The tines are attached or affixed in place, and a preferred means of accomplishing this feature is to place a collar against the rear surface of the back wall. Each collar has a longitudinal opening, and the collar is arranged so that the opening in each collar is concentric with a hole in the back wall. The tines are passed or threaded through the holes in the retaining bar and the back wall and into the opening in the collar. Thus, the forward end of the tines, which preferably are beveled, project outwardly from the retaining bar, and the opposed or rear end of the tines terminate at the collars. A suitable fastening element for each collar, such as a threaded bolt or set screw extending transversely through the wall of the collar, is tightened against the tine, thereby securing in place the tine.

In an alternative embodiment, the top of the back wall is provided with a longitudinal flange extending forwardly of the wall. At least one step is formed on the flange, and the step has a generally horizontal tread. In this manner, the operator can step onto the receptacle for servicing or for getting into the cab of the front end loader.

BRIEF DESCRIPTION OF THE ACCOMPANYING DRAWINGS

The invention and its advantages will be more readily understood by reference to the following detailed description and exemplary embodiment when read in conjunction with the following drawings, wherein.

DETAILED DESCRIPTION OF THE INVENTION

Figure 1:
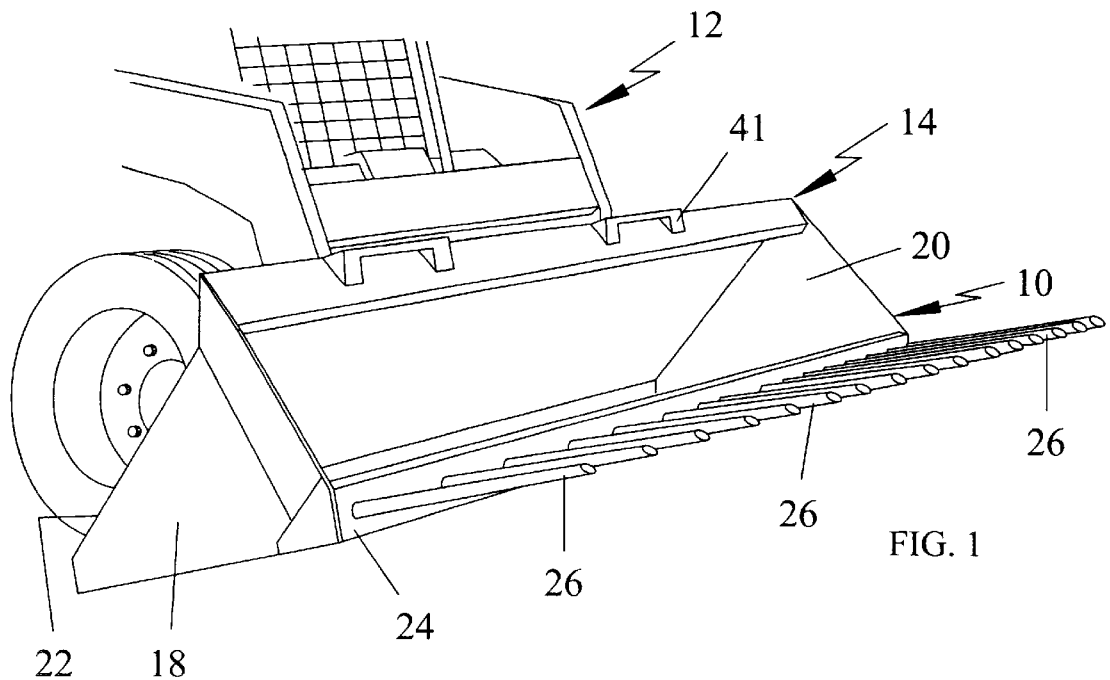
FIG. 1 is a perspective view of a stone gathering apparatus, attached to a front end loader, and embodying the present invention.
Figure 2:
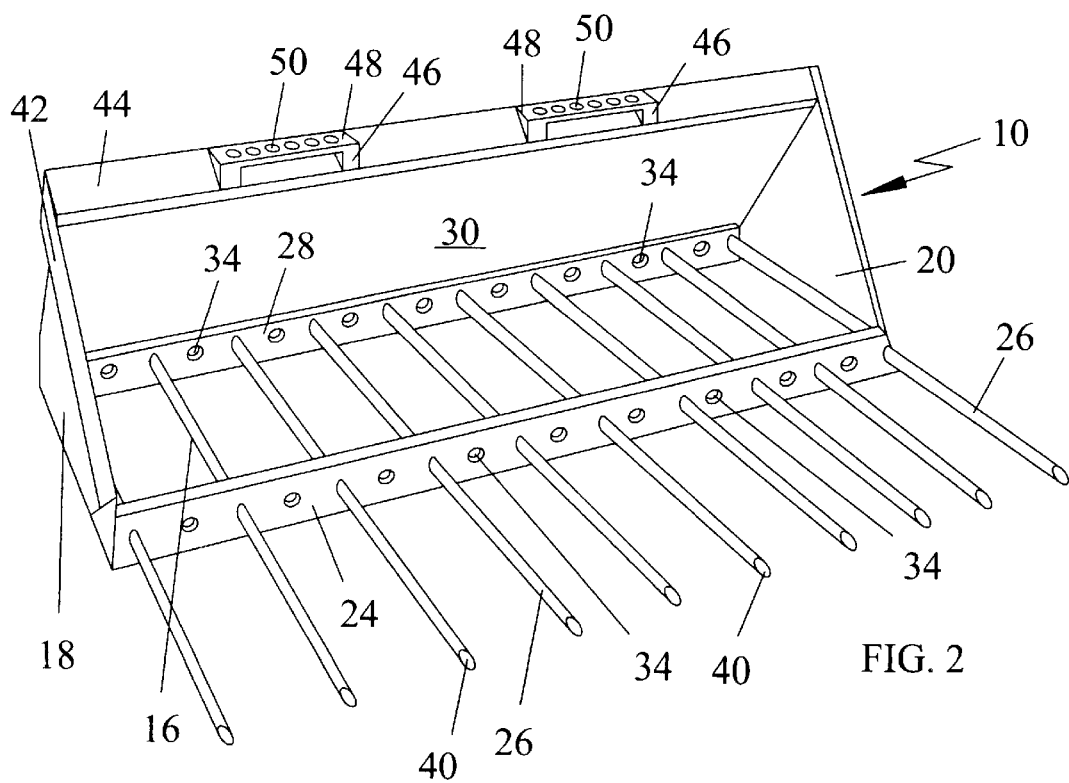
FIG. 2 is a perspective view of the stone gathering apparatus of FIG. 1, showing in more detail a preferred embodiment of the invention with the tines forming the bottom as an open arrangement.
Figure 3:
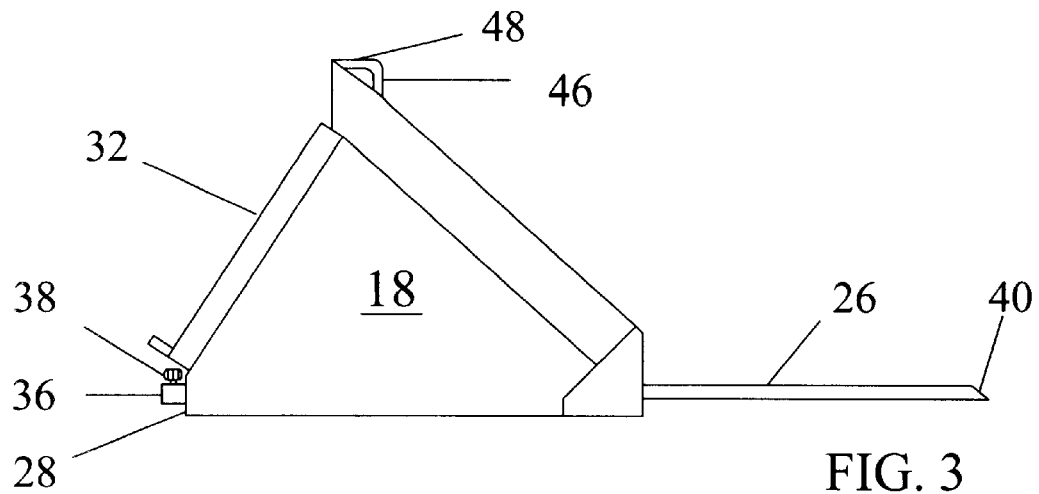
FIG. 3 is a side elevational view of the stone gathering apparatus of FIG. 2.

In accordance with the invention and as exemplified in the drawings wherein the same reference numerals refer to similar parts throughout the several views, and referring first to FIGS. 1 and 2, there is shown a stone gathering apparatus or stone picker, indicated generally by the numeral 10, formed of a suitable metal such as steel, adaptable for use with a front end loader 12, or the like. Front end loaders are well known and commercially available, such as the BOB-CAT of Clark Equipment Co. A conventional front end loader is equipped with a pivoting frame having an adapter mounting plate, and a working attachment, such as a scoop or bucket, is attached to the plate. A hydraulic actuator manipulates the frame and working attachment. In this manner, front end loaders are used for a wide variety of tasks, such as digging, grading, and construction, and the stone gathering apparatus of the present invention is attachable to the mounting plate for use in clearing the ground surface area of stones and the like. It should be understood that a front end loader, per se, is not part of the present invention, and that the term "front end loader" as used herein and in the appended claims is used generally to indicate or mean that type of tractor vehicle having a front end mounting means to which the stone gathering apparatus can be attached and can be manipulated in view of the operator.

The stone picker or stone gathering apparatus, which is attachable to the mounting plate of a front end loader or other suitable tractor-type vehicles, comprises a receptacle 14 having a bottom or flooring 16, spaced vertical end walls 18 and 20, a forwardly inclined back wall 22 extending between the end walls, and a retaining means 24. A plurality of spaced tines 26, adaptable for scraping or penetrating the ground surface, project outwardly or forwardly of the receptacle. More specifically, in the preferred embodiment of the invention, the back wall 22 consist of a vertical planar section 28, and a forwardly inclined second section 30 thereby forming an oblique angle with the first section 28. It will be observed that the first section 28 is adjacent to and substantially normal to the bottom 16, extending the full length of the wall between end walls 18 and 20, and is relatively low so as to project just above the bottom. In this manner, the second section 30 comprises the large majority of the back wall 22 (about 75% or more), and thus when viewed in side elevation, the back wall is essentially forwardly inclined so as to form an acute angle with respect to the flooring.

It will be observed that because the bottom or flooring 16 of the receptacle 14 lies in a horizontal plane and the back wall 22 is inclined forwardly with reference to the vertical, the end walls 18 and 20 have essentially a triangular configuration. The back wall extends between the end walls, and the back wall (i.e., vertical ends of the first section 28 and second section 30) is affixed to the end walls along the rearward leg of the triangular end walls. Because the flooring extends between the other legs of the triangular end walls, the remaining face of the receptacle is completely open. Because of this triangular configuration, including the inclined back wall, when the apparatus is lifted, there is ample roll back, as explained below discussing the use of the apparatus. The back side of the back wall is provided with suitable attaching means 32 for connecting the apparatus to the mounting plate of the front end loader.

The retaining means 24, preferably comprising a vertically disposed retaining bar, dam, or barrier, extends between the end walls 18 and 20. In a preferred embodiment, the retaining bar 24 and back section 28 of the back wall 22 are provided with aligned holes 34 at horizontally, spaced intervals. The rear facing of the back wall at section 28 is provided with a plurality of collars 36, and each collar is arranged over a hole 34 of the back wall so that the longitudinal opening of the collar is concentric with the hole in the back wall. Each tine 26 is threaded through the holes 34 in the retaining bar 24 and back wall section 28 and into the collar 36, and each tine is attached or fixed in place by conventional means 38, such as with a conventional threaded bolt, set screw, or spring clip. In this manner, the tines are amply supported by the back wall and retaining bar, and secured in place when affixed in the collar. The tines 26 are aligned in a horizontal plane when in a stone gathering position, and the forward portion of the tines, which preferably are beveled at the outer ends 40, are adaptable for scraping or penetrating slightly the ground, thereby gathering stones, rocks, or other debris. The tines can become damaged or broken, and by reason of my invention, the broken or damaged tine can be easily detached and replaced without the need for dismantling or reconstructing the whole apparatus. It will be observed, such as clearly illustrated in FIG. 2, that because the tines are spaced, the tines function as a sieve thereby separating the coarse material from the finer material such as permitting dirt or small particles to pass through and gathering only the relatively larger rocks. Further, the space between the tines can be adjusted by providing closely spaced holes but spacing the tines according to the size rocks to be gathered. As illustrated in the drawings, tines are inserted in alternate holes, but where desired, tines can be inserted in every hole thereby gathering relatively smaller stones. As stated above, the tines preferably extend from the back wall, and in this manner form an open flooring, which can function as a secondary sieve. Where desired, the tines can extend from the retaining bar only, and a suitable plate can be arranged between the end walls to serve as the flooring of the receptacle. The open flooring formed by the tines is advantageous, however, in that it provides not only for a sifting action, but also reduces the overall weight of the apparatus.

Figure 4:
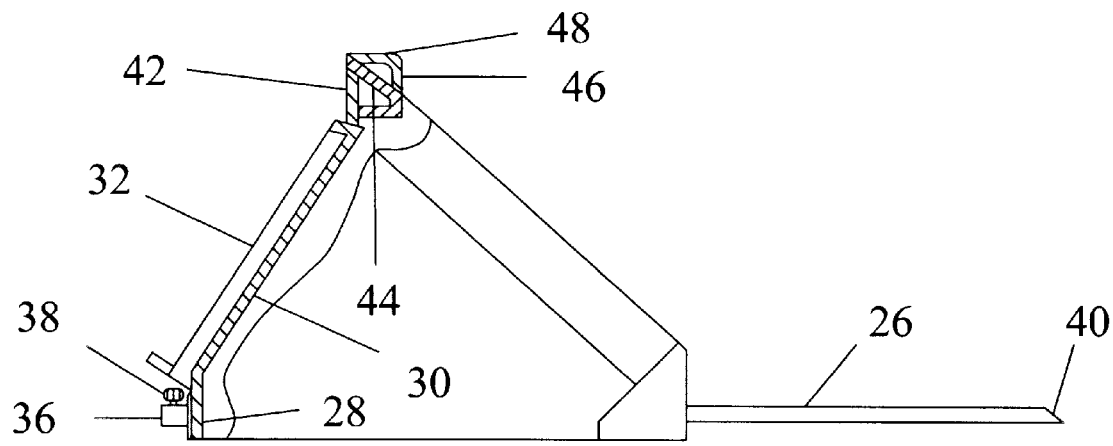
FIG. 4 is a view similar to that of FIG. 3 but partially broken away to show in cross-section certain features of the invention.
Figure 7:
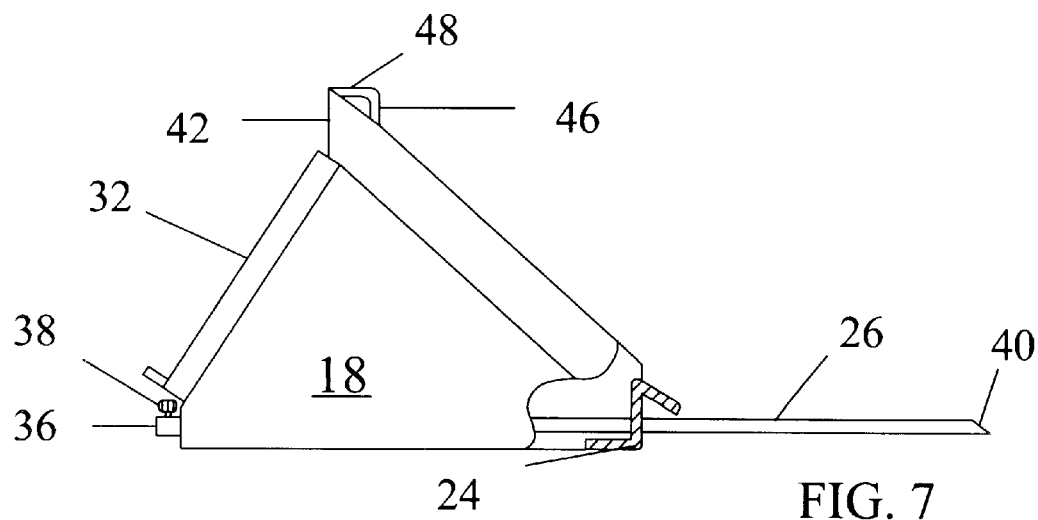
FIG. 7 is a view similar to that of FIG. 3 but partially broken away to show in cross-section certain features of the invention.
Figure 5:
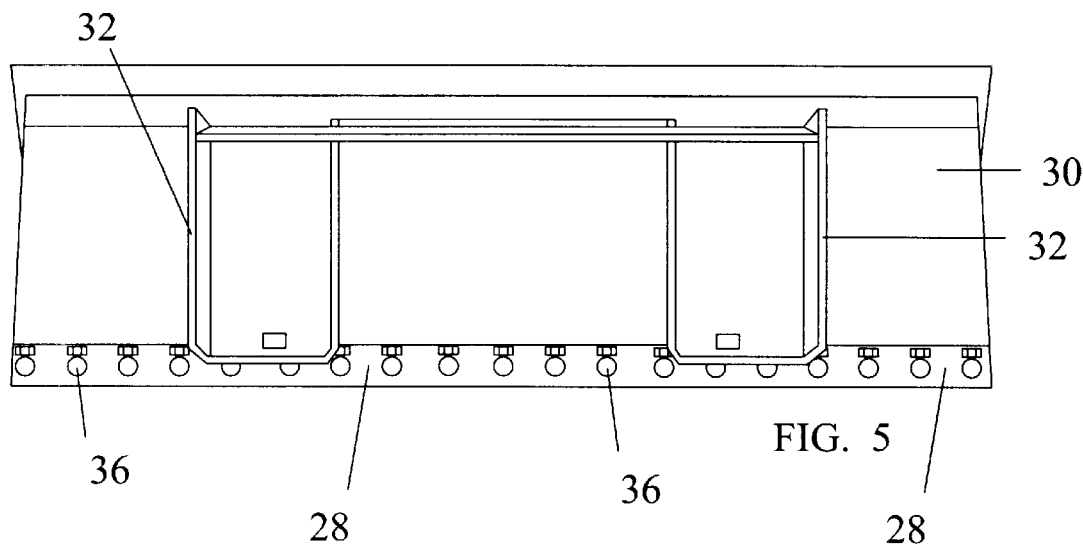
FIG. 5 is a rear elevational view of the stone gathering apparatus of FIG. 2.
Figure 6:
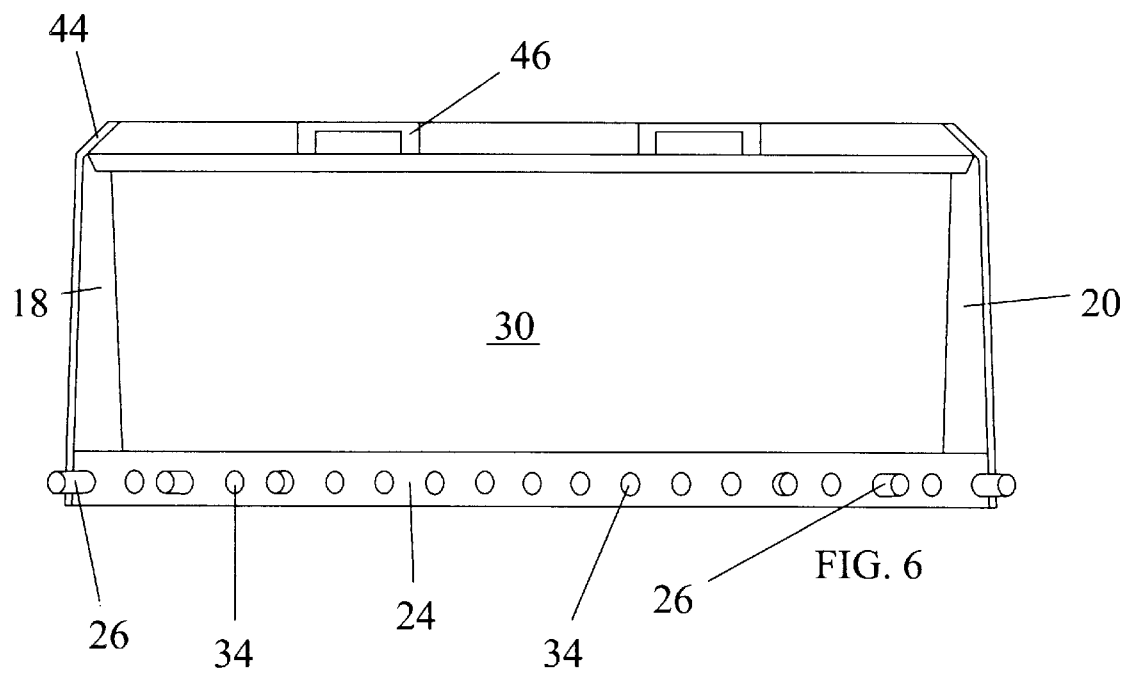
FIG. 6 is a front elevational view of the stone gathering apparatus of FIG. 2.

As best shown in FIGS. 2, 4 and 6, which illustrate a preferred embodiment of the invention, the back wall includes an inwardly struck flange section. Accordingly, back wall 22 terminates at the top with a vertical panel or extension 42, running substantially the complete length of the back wall, having an inwardly and downwardly transverse flange 44. One or more steps 46, having a horizontal tread 48, is positioned on the upper surface of the flange. Where desired, the tread is provided with a plurality of holes 50 to enhance traction. Thus, the flange provides structural strength to the apparatus, and the steps provide easy access for the operator to the receptacle and to the cab of the front end loader.

Where desired, the retaining bar may be provided with a forwardly disposed, inclined facing, so as to be sloped or inclined with reference to the horizontal. Thus, the retaining bar 24 may be sloped or inclined outwardly, or provided with an outwardly inclined surface, so as to form an oblique angle with reference to the horizontal, thereby forming an inclined plane or facing 52. (See FIG. 4.) In this manner, as the apparatus is moved forward in a stone gathering mode, the stones or rocks picked up by the forward tines 26 are more easily pushed or transported up the inclined plane and into the receptacle 14, rather than the stones abutting a vertical wall which would tend to hold the rocks back. Alternatively, as shown in FIG. 7, the retaining bar 24 may be provided along the top marginal edge with a flange 54 which depends obliquely downwardly and outwardly so as to form an inclined plane. The incline of the plane with reference to the horizontal, whether as an inclined surface to the retaining bar or as an inclined flange, is from about 20 to 60 degrees, and preferably about 30 to 45 degrees, but the angle of the slope for any particular application can be readily determined by one having skill in the art.

In use, the stone gathering apparatus is connected to the mounting plate of a front end loader or other suitable tractor-type vehicle, and when propelled forward, the front section of the tines scrap or slightly penetrate the ground. In this manner, stones and other debris are picked up by the device. When sufficient stones have been gathered on the tines, the mechanism of the front end loader is actuated to raise or pivot the apparatus, preferably at first only a few inches to shake free the dirt and small stones, and then raised or pivoted to a sufficient height and agitated to dump the stones over the retaining bar and into the receptacle. The triangular configuration of the receptacle, the retaining bar, and the inclined back wall provide for ample roll back, and therefore the receptacle can hold a large quantity of stones without falling out. If the receptacle has an open bottom, as described above, there is additional separation or sifting of the finer particles from the coarse materials. When the receptacle is sufficiently full, the apparatus is raised and pivoted in an opposite direction, and the contents then can be dumped at a selected spot so as to form a pile of stones.

It will be observed that by reason of my invention, the stone gathering apparatus provides several advantages, including such apparatus without hydraulic controls, all operation occurring ahead of and in view of the operator, and easy replacement of a damaged or broken tine. Further, it should be understood that the foregoing detailed description has been given for clearness of understanding only, and no unnecessary limitations should be understood therefrom, as modifications will be obvious to those skilled in the art.

Having described this invention and certain embodiments, I claim:

1. A stone gathering apparatus adaptable for use with a front end loader-type vehicle, comprising:
   (a) a receptacle having a generally horizontally disposed bottom when in a stone gathering position, spaced vertical end walls, and a back wall extending between said end walls and connected thereto, said back wall having a lower vertical section and a large substantially planar section inclined forwardly as viewed in side elevation;
   (b) vertically disposed barrier means adaptable for retaining stones in said receptacle and extending continuously between said end walls forwardly of said back wall and spaced therefrom, said retaining means projecting upwardly of said bottom;
   (C) a plurality of horizontally supported, spaced, parallel tines extending from said lower vertical section of said back wall through said barrier means and forwardly and outwardly from said barrier means, thereby forming said bottom as an open arrangement of said parallel tines, and adaptable for engaging the ground and for functioning as a sieve; and
   (d) means for attaching said apparatus to a front end loader.

2. A stone gathering apparatus according to claim 1 wherein said parallel tines are affixed to said back wall and extend through said barrier means, whereby said tines are supported by said back wall and said barrier means.

3. A stone gathering apparatus according to claim 1 wherein said tines are beveled at the outer ends thereof.

4. A stone gathering apparatus according to claim 1 wherein a longitudinal edge of said back wall includes a forwardly extending flange having at least one step with a generally horizontal tread.

5. A stone gathering apparatus according to claim 1 wherein said barrier means comprises a vertically disposed bar extending upwardly from said tines and between and connected to said side walls; said lower section of said back wall and said bar are provided with a plurality of spaced, aligned holes; said tines extend through said aligned holes; and means for securing said tines to said lower section of said back wall.

6. A stone gathering apparatus according to claim 5 wherein said means for securing said tines comprises a plurality of collars with a longitudinal opening adaptable for receiving one end of each of said tines, each collar affixed to a rear surface of said lower section of said back wall so that the opening of each collar is concentric with each hole in said lower section of said back wall, and a fastening element for each collar to secure each tine.

7. A stone gathering apparatus according to claim 1 wherein said back wall includes (a) a lower planar surface adjacent said bottom and substantially normal thereto, and (b) an upper planar surface being oblique to said lower surface and inclined forwardly.

8. A stone gathering apparatus according to claim 5 wherein said bar includes a forwardly disposed sloped face inclined with reference to the horizontal and terminating at about a top of the tines.

9. A stone gathering apparatus according to claim 5 wherein said bar is provided with a top marginal edge having a flange depending obliquely downwardly and outwardly so as to form an outwardly disposed surface inclined with reference to the horizontal.

10. A stone gathering apparatus according to claim 6 wherein said bar includes a forwardly disposed sloped face inclined with reference to the horizontal and terminating at about a top of the tines.

11. A stone gathering apparatus according to claim 6 wherein said bar is provided with a top marginal edge having a flange depending obliquely downwardly and outwardly so as to form an outwardly disposed surface inclined with reference to the horizontal.

12. A stone gathering apparatus for use with a front end loader-type vehicle, comprising:
   (a) a receptacle having a generally horizontally disposed bottom when in a stone gathering position, spaced vertical end walls, and a back wall extending between said end walls and connected thereto, said back wall having (a) a lower planar surface adjacent said bottom and substantially normal thereto, and (b) an upper planar surface being oblique to said lower planar surface and inclined forwardly as viewed in side elevation;
   (b) a vertically disposed bar adaptable for retaining stones in said receptacle and extending continuously between said end walls and connected thereto and disposed forwardly of said back wall and spaced therefrom, said bar projecting upwardly of said bottom;
   (C) said lower planar surface and said bar having a plurality of spaced, aligned holes;
   (d) a plurality of horizontally disposed, spaced, parallel tines extending from said lower planar surface through said holes and outwardly from said bar and adaptable for engaging the ground, thereby forming said bottom of said receptacle as an open network;
   (e) a plurality of collars, each with a longitudinal opening adaptable for receiving one end of one of said tines, each collar affixed on a rear surface of said lower planar surface so that the opening of each collar is concentric with each aligned hole of said lower planar surface, and a fastening element for each collar to secure one of said plurality of parallel tines; and (f) means for attaching said apparatus to a front end loader.

13. A stone gathering apparatus according to claim 12 wherein said bar includes a forwardly disposed sloped face inclined with reference to the horizontal.

14. A stone gathering apparatus according to claim 12 wherein said bar is provided with a top marginal edge having a flange depending obliquely downwardly and outwardly so as to form an outwardly disposed surface inclined with reference to the horizontal and terminating at about a top of the tines.

* * * * *